United States Patent [19]

Murphy

[11] Patent Number: 5,186,799

[45] Date of Patent: * Feb. 16, 1993

[54] METHOD FOR IMPROVING THE ACTIVITY MAINTENANCE OF A PLASMA INITIATOR

[75] Inventor: William J. Murphy, Brights Grove, Canada

[73] Assignee: Exxon Research and Engineering Company, Florham Park, N.J.

[*] Notice: The portion of the term of this patent subsequent to Dec. 4, 2007 has been disclaimed.

[21] Appl. No.: 695,199

[22] Filed: May 3, 1991

Related U.S. Application Data

[63] Continuation of Ser. No. 457,621, Dec. 27, 1989, abandoned.

[51] Int. Cl.$^5$ ................................................ C07C 7/00
[52] U.S. Cl. ................................ 204/157.15; 204/156
[58] Field of Search ................... 204/156, 157.15, 168, 204/170

[56] References Cited

U.S. PATENT DOCUMENTS

| | | | |
|---|---|---|---|
| 4,574,038 | 3/1986 | Wan | 204/157.15 |
| 4,975,164 | 12/1990 | Ravella et al. | 204/156 |
| 5,015,349 | 5/1991 | Suib et al. | 204/168 |

Primary Examiner—W. Gary Jones
Assistant Examiner—Dean Nguyen
Attorney, Agent, or Firm—John W. Ditsler

[57] ABSTRACT

The activity maintenance of the plasma initiators used during the upgrading of a hydrocarbon feedstock in a reaction zone using microwave radiation can be improved if molecular hydrogen is added to the reaction zone such that the weight ratio of carbon (in the molecules in contact with the plasma initiators) to hydrogen is maintained at less than 6:1 during upgrading.

10 Claims, 2 Drawing Sheets

METHOD FOR IMPROVING THE ACTIVITY MAINTENANCE OF A PLASMA INITIATOR

This is a continuation of application Ser. No. 457,621, filed Dec. 27, 1989, now abandoned.

BACKGROUND OF THE INVENTION

1. Field of the Invention

This invention relates to a method for improving the activity maintenance of a plasma initiator using molecular hydrogen.

2. Description of Related Art

Microwave energy has been used to convert methane to other hydrocarbons. For example, U.S. Pat. No. 4,574,038 discloses that methane can be converted to ethylene and hydrogen in a batch process at pressures of from 0.3 to 1 atmosphere by subjecting the methane to microwave radiation in the presence of a metal powder catalyst. Another example of methane conversion using microwave energy is U.S. Pat. No. 3,663,394.

Microwave energy has also been used to treat liquid hydrocarbons. For example, U.S. Pat. No. 3,616,375 discloses a method of decreasing the sulfur content of crude oil and other petroleum products using microwave energy. As another example, U.S. Pat. No. 4,234,402 discloses that a variety of petroleum products can be hydrogenated and desulfurized by contact with hydrogen and microwave energy. As yet another example, U.S. Pat. No. 4,279,722 discloses that a number of petroleum refinery operations can be improved by subjecting the hydrocarbon reactants and catalysts to microwave energy. In addition, German Patent 2,535,119 discloses a method for conducting chemical reactions by subjecting a catalyst particle in a fluid medium containing the chemical reagents to microwave energy.

However, none of these patents suggest the process described below.

SUMMARY OF THE INVENTION

This invention concerns a method for improving the activity maintenance of a plasma initiator used during the upgrading of a hydrocarbon feedstock by microwave radiation. More specifically, the activity maintenance of one or more plasma initiators used during the upgrading of a hydrocarbon feedstock in a reaction zone by microwave radiation can be improved by adding molecular hydrogen to the reaction zone in an amount such that the weight ratio of carbon (in the molecules in contact with the plasma initiators) to hydrogen is always maintained at less than 6:1 during upgrading.

DETAILED DESCRIPTION OF THE INVENTION

Figure 1:
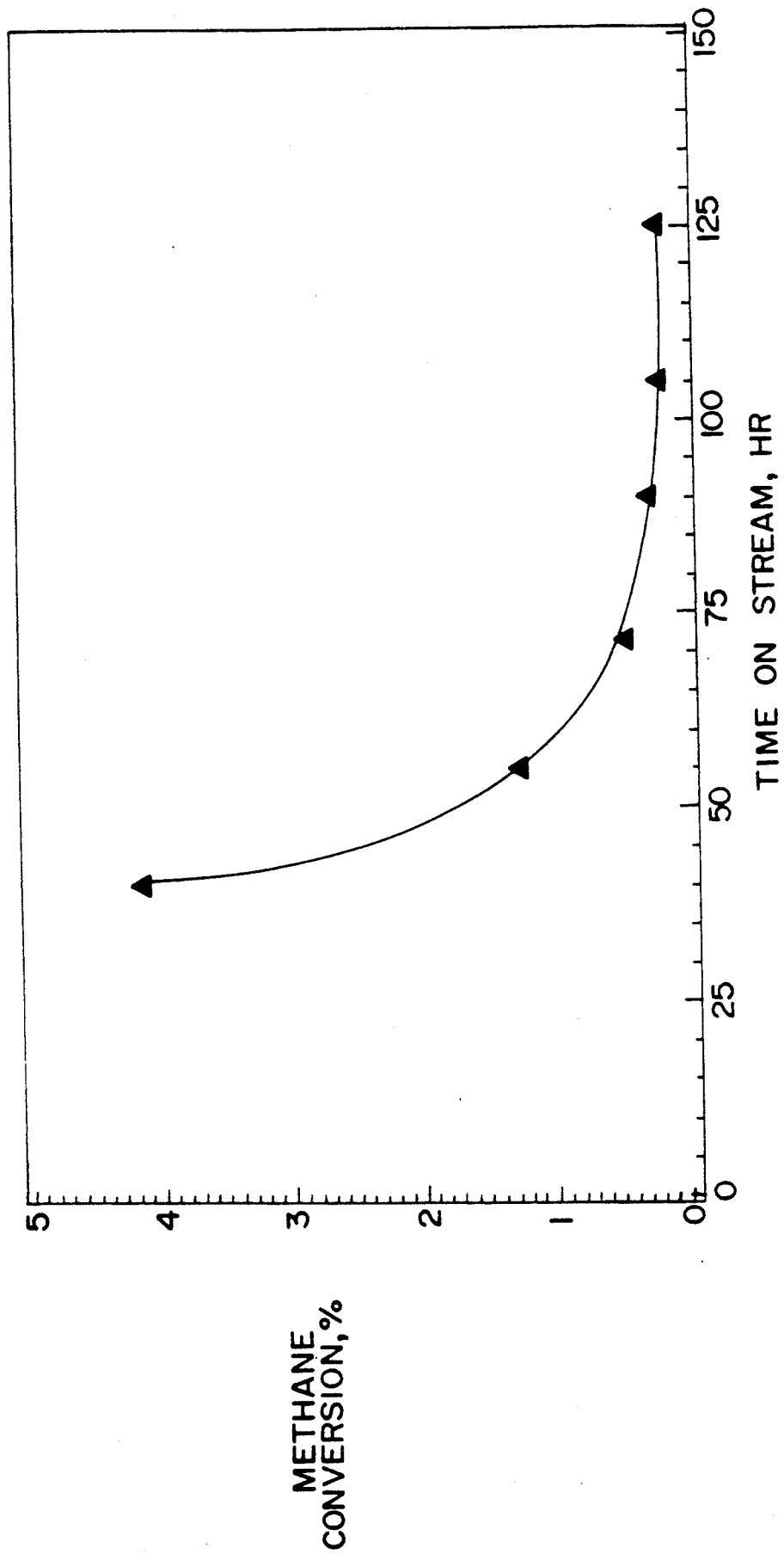
FIG. 1 is a graph of methane conversion versus time which shows that poor methane conversion (and initiator activity maintenance) results from the absence of added hydrogen.

Copending patent application U.S. Ser. No. 457,604 (filed on the same date herewith) disclose the upgrading of methane and other hydrocarbon feedstocks using microwave energy in the presence of at least one plasma initiator. However, during upgrading, the initiator will become deactivated due to the formation of carbonaceous deposits thereon, such that the initiator's activity for upgrading the hydrocarbon feedstock will decrease with time.

I have found that if a sufficient amount of molecular hydrogen is not present in the reaction zone at the start of the upgrading reaction, the initiators will deactivate (thereby resulting in poor activity maintenance) until a sufficient amount of hydrogen is present (or has accumulated, for example, by recycling hydrogen formed during upgrading) to retard deactivation and stabilize the upgrading at a particular level. This so-called induction period results in an initial loss of initiator activity and, hence, a lower level of upgrading than if hydrogen had been added initially (i.e. at the start of the upgrading reaction). I have discovered that adding an extraneous stream of hydrogen to the reaction zone at the start of the upgrading reaction can significantly improve the activity maintenance of the plasma initiators (and, hence, the upgrading reaction) relative to the activity maintenance obtained if hydrogen were not added initially.

The amount of hydrogen added to the reaction zone must be sufficient to maintain a carbon (based on carbon in the molecules in contact with the plasma initiators) to hydrogen weight ratio less than 6:1, preferably less than 4:1, more preferably less than 3:1, and most preferably less than 1.5:1. Although some upgrading may occur at weight ratios of 6:1 or more, improved upgrading and better activity maintenance will be obtained at lower weight ratios because hydrogen tends to reduce or inhibit the formation of carbonaceous deposits on the plasma initiators. While not wishing to be bound by any particular theory, it is believed that at higher weight ratios, greater amounts of deposits accumulate on the initiators and inhibit their ability to ionize the gas environment. The extraneous hydrogen may be pure or in a mixture with other gases (e.g. as from a naphtha reformer) and may be added to the reaction zone separately or in mixture with the hydrocarbon feedstock.

The term "upgrading" as used herein is meant to include a variety of processes such as alkylation, cracking, demetalization, denitrogenation, desulfurization, hydrocracking, hydrogenation, isomerization, pour point reduction, combinations thereof, and the like. However, the particular type of upgrading obtained will depend on the particular hydrocarbon feedstock used and the operating conditions (and procedures) employed. For example, should hydrogen atoms dominate the product mix then hydrogenation would be expected to be the dominant upgrading step. However, if alkyl radicals or ions are the dominant active species, then alkylation would be the dominant reaction.

Suitable hydrocarbon feedstocks for the above mentioned upgrading processes are well known in the art. These feedstocks include whole crude as well as any of its fractions such as naphthas, light gas oils, heavy gas oils, residual fractions, reduced crude oils, cycle oils derived from any of these, or mixtures thereof. Gases such as methane (pure or mixed with other gases) are included as well. The hydrocarbon may be derived from petroleum sources or from shale oil kerogen, tar sands, bitumen processing, synthetic oils, coal hydrogenation, and the like. The hydrocarbon may be in the gas (or vapor) phase or in the liquid phase at upgrading conditions.

The plasma initiator referred to herein may be essentially any material capable of accumulating an electric charge when placed in an electromagnetic field and then dissipating the charge (or initiating an electric discharge), for example, by ionizing a gas environment. This includes metal initiators, non-metal initiators (including semiconductors), and composites of metal and non-metal initiators. As used herein, "composite" is meant to include mixtures (or combinations) of metals and non-metals. Examples of suitable metal initiators are tungsten, iron, nickel, copper, their alloys, or mixtures thereof. Preferred metal initiators are tungsten, iron, or mixtures thereof. Examples of suitable non-metal initiators include carbon, alumina, manganese dioxide, magnetite, nickel oxide (e.g. NiO), iron oxide (e.g. $Fe_3O_4$), calcium aluminate, cobalt oxide, chromium nitride, iron sulfide (e.g. $FeS_2$, $Fe_{1-x}S$) copper sulfide (e.g. $Cu_2S$) or mixtures thereof. Carbon, iron oxide, and calcium aluminate are preferred, with carbon being particularly preferred. Silica is not a suitable non-metal initiator. However, silica composited with a metal initiator or another non-metal initiator would be a suitable plasma initiator.

Although upgrading can be effected using only one plasma initiator, upgrading is enhanced if more than one (e.g. 6 or more) plasma initiators is used. Preferably, a plurality of plasma initiators are used. Most preferably, the plasma initiator will comprise a plurality of metal wire segments. Each plasma initiator should be of at least a minimum length that is sufficient to initiate an electric discharge when placed in an electromagnetic field. However, the precise minimum length of each initiator will vary with the frequency of the microwave source as well as the geometry of the reaction zone and of the initiator.

If more than one plasma initiator is used, a minimum distance should be maintained between each initiator to facilitate dissipation of the electric charge. However, the minimum distance will vary depending upon the frequency of the microwave source. As an example, the minimum distance should be at least about 0.25 cm, preferably at least about 0.5 cm, for a frequency of 2.45 GHz.

The plasma initiators should be elongated, but may be formed, combined, or bent in any convenient shape (e.g. straight, helix, spiral, and the like). Preferably, the initiators should be formed such that there are points or sharp edges at the ends or on the surface of the initiators.

The plasma initiators may be stationary within the reaction zone or they may be in motion. The motion can result from the initiators being fluidized by a gas (e.g. the hydrocarbon feedstock) or by other means (e.g. an external magnetic field gradient).

The frequency of the microwave source can vary broadly. Typically, however, the microwave energy will have a frequency of at least 0.3 GHz, with frequencies centered around 0.915, 2.45, 5.80, or 22.0 GHz being presently preferred in North America; particularly frequencies centered around 0.915, 2.45, or 5.80 GHz; especially frequencies centered around 0.915 or 2.45 GHz.

The microwave energy used in this invention may be continuous or pulsed. If pulsed, the duration of on-time pulses can vary broadly, but typically will range from about 1 nanosecond to about 20 seconds, preferably from about 1 millisecond to about 10 seconds, and most preferably from about 0.01 to about 0.2 seconds. The duration of off-time rests can vary broadly as well, but typically will range from about 1 nanosecond to about 100 seconds, preferably from about 0.003 to about 60 seconds, and most preferably from about 0.3 to about 5 seconds.

The upgrading process as described above can be practiced at any convenient temperature and pressure, including ambient conditions.

This invention will be further understood by reference to the following Examples which are not intended to restrict the scope of the appended claims.

Example 1 - Hydrogen is Required For Good Methane Conversion and Initiator Activity Maintenance Methane flowing at 22.5 ml/min (milliliters/min) at atmospheric pressure was contacted with 1.5 gm of tungsten wire (about 0.03 inches in diameter and cut into 45 mm lengths) in a reactor fabricated from WR430 waveguide bounded by quartz plate glass windows and positioned approximately one-quarter waveguide wavelength from a short circuit plate. The reactor was irradiated with microwave radiation centered at a 2.45 GHz frequency and pulsed in an on/off cycle (0.14 seconds on in a total of 3.5 seconds) with an average power of 3.6 watts. Methane conversion being calculated according to the following equation:

$$\% \text{ Methane Conversion} = \left[ 1 - \frac{\text{wt \% methane in the products}}{\text{wt \% methane in the feed}} \right] \times 100$$

The data obtained (as illustrated in FIG. 1) show that methane conversion rapidly decreases to essentially zero conversion after about 2 hours when only methane is reacted. This data also illustrates that poor activity maintenance results from the absence of added hydrogen in the reactor.

Figure 2:
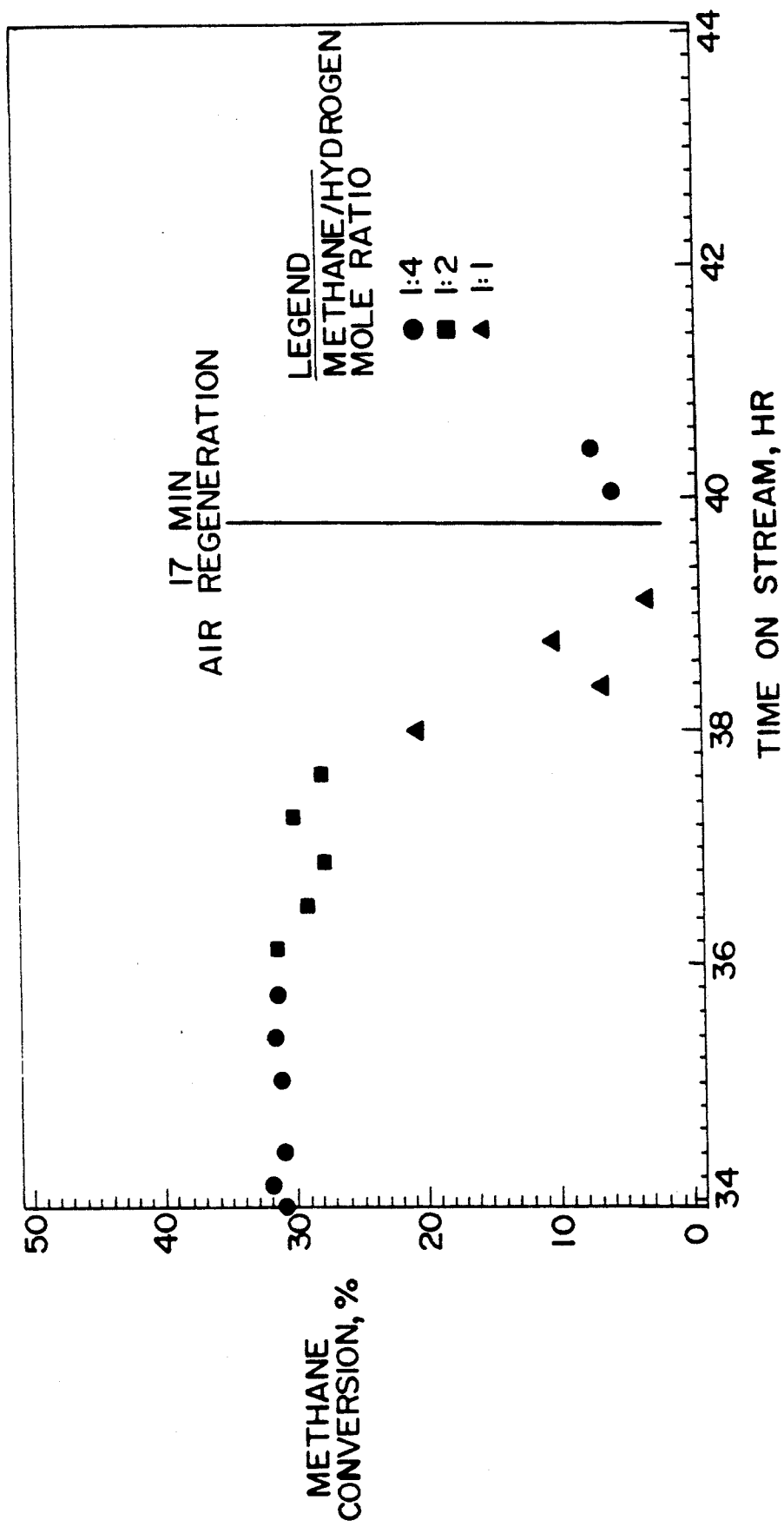
FIG. 2 is a graph of methane conversion versus time which shows the effect of the methane/hydrogen mole ratio on methane conversion (and initiator activity maintenance).

Example 2 - Effect of $CH_4/H_2$ Mole Ratio on Methane Conversion and Initiator Activity Maintenance Using the apparatus of Example 1 (except that 2.9 gm of iron wire was used and the average power ranged from 7.5 to 10 watts), a methane/hydrogen mixture (1:4 mole ratio, equivalent to 1:1 carbon/hydrogen weight ratio) flowing at 25 ml/min was introduced into the reactor. The methane/hydrogen mole ratio was then decreased from 1:4 to 1:1 [equivalent to a weight ratio of carbon to hydrogen of 2.1]. The results of this test (as illustrated in FIG. 2) show that a reduction of the methane/hydrogen mole ratio from 1:4 to 1:2 (equivalent to a weight ratio of carbon to hydrogen of 1.5:1) had little effect on methane conversion. However, a further reduction to 1:1 resulted in a significant decrease in methane conversion. This decrease proved to be irreversible as shown by the further contact with the methane/hydrogen mixture (1:4 mole ratio) following 17 minutes of regeneration in air. Thus, the mole ratio of methane to hydrogen (weight ratio of carbon to hydrogen) should be at least 1:2 (1.5:1 or less), most preferably at least 1:4 (1:1 or less), to obtain an improved methane conversion (and initiator activity maintenance) relative to the methane conversion (activity maintenance) obtained if hydrogen were not added initially.

What is claimed is:

1. A method for improving the activity maintenance of at least one plasma initiator during upgrading of a hydrocarbon feedstock in a reaction zone by using microwave radiation which comprises adding molecular hydrogen to the reaction zone for a period time sufficient to ensure that the weight ratio of carbon (in the molecules in contact with the plasma initiator) to hydrogen is less than 6:1 during upgrading.

2. The method of claim 1 wherein the plasma initiator is a metal.

3. The method of claim 2 wherein the metal is tungsten, iron, nickel, copper, their alloys, or mixtures thereof.

4. The method of claim 3 wherein the metal is tungsten, iron, or mixtures thereof.

5. The method of claim 1 wherein the plasma initiator is a non-metal other than silica.

6. The method of claim 5 wherein the non-metal is carbon, alumina, or mixtures thereof.

7. The method of claim 1 wherein the plasma initiator is a composite of a metal initiator and a non-metal initiator.

8. The method of claim 1 wherein a plurality of plasma initiators are present in the reaction zone.

9. The method of claim 1 wherein the regeneration is performed in the presence of microwave radiation having a frequency of at least 0.3 GHz.

10. The method of claim 1 wherein the weight ratio of carbon to hydrogen is less than 4:1.

* * * * *